US008576055B2

(12) United States Patent
Hara et al.

(10) Patent No.: US 8,576,055 B2
(45) Date of Patent: Nov. 5, 2013

(54) COLLISION AVOIDANCE ASSISTING SYSTEM FOR VEHICLE

(75) Inventors: Yoshitaka Hara, Hitachinaka (JP); Yuji Hosoda, Kasumigaura (JP); Masashi Koga, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 12/699,207

(22) Filed: Feb. 3, 2010

(65) Prior Publication Data

US 2010/0201509 A1 Aug. 12, 2010

(30) Foreign Application Priority Data

Feb. 3, 2009 (JP) ................................ 2009-022325

(51) Int. Cl.

| | |
|---|---|
| ***B60Q 1/00*** | (2006.01) |
| ***G06K 9/00*** | (2006.01) |
| ***G01C 22/00*** | (2006.01) |

(52) U.S. Cl.

USPC ........... 340/435; 340/436; 340/437; 340/438; 382/103; 701/23; 701/400

(58) Field of Classification Search

None

See application file for complete search history.

(56) References Cited

U.S. PATENT DOCUMENTS

| | | | | |
|---|---|---|---|---|
| 5,517,412 | A * | 5/1996 | Unoura | 701/23 |
| 7,411,486 | B2 * | 8/2008 | Gern et al. | 340/438 |
| 7,747,039 | B2 | 6/2010 | Fujimoto | |
| 7,966,127 | B2 * | 6/2011 | Ono et al. | 701/300 |
| 2003/0046003 | A1 * | 3/2003 | Smith et al. | 701/213 |
| 2005/0017857 | A1 * | 1/2005 | Rao et al. | 340/435 |
| 2005/0134440 | A1 * | 6/2005 | Breed | 340/435 |
| 2005/0152580 | A1 * | 7/2005 | Furukawa et al. | 382/103 |
| 2007/0274566 | A1 * | 11/2007 | Fujimoto | 382/103 |
| 2008/0042812 | A1 * | 2/2008 | Dunsmoir et al. | 340/435 |
| 2008/0309468 | A1 | 12/2008 | Greene et al. | |

FOREIGN PATENT DOCUMENTS

| | | |
|---|---|---|
| EP | 1 564 703 | 8/2005 |
| EP | 1 975 903 | 10/2008 |
| JP | 10-105891 | 4/1998 |

(Continued)

OTHER PUBLICATIONS

Japanese Office Action for Japanese Patent Application No. 2009-022325, dispatched on Jul. 24, 2012.

*Primary Examiner* — George Bugg
*Assistant Examiner* — Renee Dorsey
(74) *Attorney, Agent, or Firm* — Antonelli, Terry, Stout & Kraus, LLP.

(57) ABSTRACT

A collision avoidance assisting system for a vehicle, for expecting a risk of colliding upon a moving object (or a moving obstacle), including a pedestrian, more correctly, but without annoying a driver, excessively, by estimating the risk to be excessively high, comprises a moving object detecting means for detecting a moving object existing on periphery of the vehicle; a footway boundary detecting means for detecting a position and a configuration of a footway boundary object on periphery of the vehicle; a risk estimation means for estimating a risk that the moving object detected by said moving object detecting means collides on the vehicle; and an alarm means for calling an attention to a driver of the vehicle, upon basis of the risk of collision estimated by the risk estimation means, wherein the risk of collision between the moving object, which is detected by the moving object detecting means, and that vehicle is estimated by taking at least the position information of the moving object, the position information of the footway boundary object and conditions of the circumferences thereof.

15 Claims, 11 Drawing Sheets

(56) References Cited

FOREIGN PATENT DOCUMENTS

| | | |
|---|---|---|
| JP | 11-016099 | 1/1999 |
| JP | 2003-216937 | 7/2003 |
| JP | 2005-228127 | 8/2005 |
| JP | 2006-039697 | 2/2006 |
| JP | 2006-163637 | 6/2006 |
| JP | 2006-185406 | 7/2006 |
| JP | 2007-128430 | 5/2007 |
| JP | 2007-264717 | 10/2007 |
| JP | 2008-003762 | 1/2008 |
| JP | 2008-143387 | 6/2008 |
| JP | 2008-186170 | 8/2008 |

* cited by examiner

COLLISION AVOIDANCE ASSISTING SYSTEM FOR VEHICLE

BACKGROUND OF THE INVENTION

The present invention relates to a collision avoidance assisting system for a vehicle, for detecting a moving object, including a pedestrian (i.e., a moving obstacle), around that vehicle and in danger of colliding on that vehicle, and thereby assisting that vehicle to avoid collision on the moving object, including the pedestrian, within a vehicle, such as, a car, for example.

Conventionally, as is shown in the following Patent Document 1 and the Patent Document 2, etc., the collision avoidance assisting system for a car is already proposed and known, which detects a moving object including a pedestrian, being in surrounding of the car, and generates an alarm to a driver of the car when deciding a presence of danger (i.e., a possibility) of collision on that car, within the vehicle.

However, in the collision avoidance assisting system for the vehicle, if generating an alarm upon a reason of only a presence of the moving object, including the pedestrian, i.e., there is a danger (or, possibility) of collision, simply, then there may be included an alarm generation, which is inherently unnecessary, and a number of generations of the alarms comes to be large, but this is rather troublesome or annoying for the driver of the car. For that reason, there is also already proposed the collision avoidance assisting system for the car, with further determining a degree of the danger of collision (i.e., a risk of collision), too, in addition to the presence of that danger of collision, and thereby to add an importance to the alarm to be generated. In the following Patent Document 3, with predicting a movement of the pedestrian with using a difference between the positions of the pedestrian measured at two (2) or more different times, the risk of collision is determined.

PRIOR ART DOCUMENTS

Patent Documents

[Patent Document 1] Japanese Patent Laying-Open No. Hei 10-105891 (1998);
[Patent Document 2] Japanese Patent Laying-Open No. 2003-216937 (2003); and
[Patent Document 3] Japanese Patent Laying-Open No. 2008-186170 (2008).

BRIEF SUMMARY OF THE INVENTION

With the conventional technologies mentioned above, detection is made on the moving object including the pedestrian, and upon basis of the moving velocity thereof, the danger or the risk of collision upon that moving object. However, only with this, it is not possible to correctly predict the collision upon the moving object, necessarily; thus, the alarm generated from the collision avoidance assisting system for a car is still troublesome or annoying for the driver of the car, and this can be a reason for the driver to keep out the use of using that collision avoidance assisting system for a car, in spite of the important function thereof.

Then, according to the present invention, by taking the problems of the conventional technologies mentioned above into the consideration thereof, an object thereof is to provide a collision avoidance assisting system for a vehicle, for enabling more correct prediction of collision upon the moving object; i.e., with increasing accuracy in determination of a risk of collision, and thereby enabling to generate a useful/effective alarm, without annoying the driver.

Thus, according to the present invention, also similar to the conventional technologies mentioned above, though trying to provide the collision avoidance assisting system for a vehicle for generating the alarm with adding a degree of importance, however in that case, in general, it is also possible to obtain the degree of danger or risk of collision, further correctly and with higher accuracy, if possible to predict the movement of the moving object including the pedestrian (e.g., the moving obstacle) and the movement of the vehicle, with accuracy. However, it is not easy to predict the moving velocity of such moving object including the pedestrian, as was mentioned before, correctly; then, according to the present invention, it is achieved upon an acknowledge of the inventors of the present invention, which will be mentioned below.

For example, in case where a guardrail is provided on a boarder between a drive way and a foot way (hereinafter, being called "drive way/foot way boundary" or "foot way boundary", simply), and if considering an action of the pedestrian waling on that foot way, a possibility is low that the pedestrian comes out on a drive way climbing over the guardrail, even if a speed vector of that pedestrian directs to the drive way. Thus, in such the case, if obtaining the degree of danger or risk of collision with using only the speed vector of the pedestrian, the degree of danger or risk is estimated to be extremely high, then the alarm generated is still troublesome or annoying for the driver of the car.

Thus, according to the present invention, taking the drawbacks of the conventional arts mentioned above into the consideration thereof, and further upon basis of the acknowledge of the inventors mentioned above, it is an object to provide a collision avoidance assisting system for a vehicle, for enabling to predict the degree of danger or risk of collision, further correctly, by taking the condition of the moving object detected, including the pedestrian, and that of surroundings thereof, as well, into the consideration thereof, and thereby enabling to generate an effective alarm, but not estimating the degree of danger or risk to be high, extremely, i.e., without annoying the driver extremely.

Thus, according to the present invention, for accomplishing the object mentioned above, firstly there is provided a collision avoidance assisting system for a vehicle, comprising: a moving object detecting means, which is configured to detect a moving object existing on periphery of the vehicle; a footway boundary detecting means, which is configured to detect a position and a configuration of a footway boundary object on periphery of said vehicle; a risk estimation means, which is configured to estimate a risk that the moving object detected by said moving object detecting means collides on said vehicle; an alarm means, which is configured to call an attention to a driver of said vehicle, upon basis of the risk of collision estimated by said risk estimation means; and further a positional relationship analyzing means, which is configured to output at least a relative distance between said moving object and said footway boundary object and a relative distance between said moving object and said vehicle, from position information of the moving object, which is detected by said moving object detecting means, and position/configuration information of the footway boundary object, which is detected by said footway boundary object detecting means, wherein said risk estimation means estimates the risk of collision between the moving object, which is detected by said moving object detecting means, and said vehicle, at least from the relative distance between said moving object and said footway boundary object, which is outputted from said positional relationship analyzing means, and the relative distance between said moving object and said vehicle, which is outputted from said positional relationship analyzing means.

Also, according to the present invention, within the collision avoidance assisting system for a vehicle, as described in the above, it is preferable that said positional relationship analyzing means further outputs a relative distance between said vehicle and said footway boundary object, too, and said risk estimation means estimates the risk of collision between the moving object, which is detected by said moving object detecting means, and said vehicle, also including the relative distance between said vehicle and said footway boundary object, which is outputted from said positional relationship analyzing means, in addition to the relative distance between said moving object and said footway boundary object and the relative distance between said moving object and said vehicle, which are outputted from said positional relationship analyzing means, or that said footway boundary detecting means further outputs a height of said footway boundary object, too, and said risk estimation means estimates the risk of collision between the moving object, which is detected by said moving object detecting means, and said vehicle, also including the height of said footway boundary object, which is outputted from said footway boundary detecting means, in addition to the relative distance between said moving object and said footway boundary object and the relative distance between said moving object and said vehicle, which are outputted from said positional relationship analyzing means. Further, it is preferable that it further comprises a risk estimation parameter memory means, which is configured to memorize a risk estimation parameter therein, and said risk estimation parameter memory means changes said risk estimation parameter depending on a maintenance condition, including at least one of a driving capacity of said vehicle, weather and a road.

Further, according to the present invention, within the collision avoidance assisting system for a vehicle, as described in above, it is preferable that said footway boundary detecting means has an object attribute discrimination function for detecting an attribute, including either one of a king or a material of the footway boundary object on periphery of said vehicle, and said risk estimation means estimates the risk of collision between the moving object, which is detected by said moving object detecting means, and said vehicle, depending on the attribute of said footway boundary object, which is detected by the object attribute discrimination function provided by said footway boundary detecting means, and further the object attribute discrimination function provided by said footway boundary detecting means is for detecting the height of said footway boundary object, in addition to either one of the king or the material of the object including the footway boundary object, whereby estimating the risk of collision between the moving object, which is detected by said moving object detecting means, and said vehicle, depending on the detected height of said footway boundary object.

Further, according to the present invention, within the collision avoidance assisting system for a vehicle, as described in above, it is preferable that, as the footway boundary object on periphery of said vehicle to be detected by said footway boundary detecting means is included a road facility, including any one of a road edge difference, or a guardrail, or a hedge, or a division line by a white line, and further said footway boundary detecting means detects the position and the configuration of said footway boundary object, and said positional relationship analyzing means has a moving object/footway boundary distance calculation means for calculating a distance between the moving object and the footway boundary, a moving object/vehicle distance calculation means for calculating a distance between the moving object and the vehicle, and a vehicle/footway boundary distance calculation means for calculating a distance between the vehicle and the footway boundary, and in that instance, it is preferable that it further comprises a video obtaining means for obtaining video information around the moving object, which exists on periphery of the vehicle, wherein said moving object/footway boundary distance calculation means determines on whether the moving object is on a footway or not, with using the video information obtained by said video obtaining means, when said distance between the footway boundary is near to zero (0), and corrects said distance between the moving object and the footway boundary depending upon a result of said determination.

In addition thereto, according to the present invention, within the collision avoidance assisting system for a vehicle, as described in the above, it is preferable that said moving object detecting means further comprises a moving object moving direction detecting means for detecting a moving direction of the moving object, which is detected by said moving object detecting means, and said risk estimation means estimates the risk of collision between the moving object, which is detected by said moving object detecting means, and said vehicle, depending on the moving direction of said moving object, which is detected by said moving object moving direction detecting means.

As was mentioned above, according to the present invention, it is possible to provide the collision avoidance assisting system for a vehicle, for enabling to suppress an unnecessary generation of alarm, with estimating the risk of collision between the moving object and the vehicle, more correctly, not only detecting a person or man having a danger of collision (i.e., the moving object), but also by taking the condition of circumferences thereof depending on the positional relationship between that moving object and the objects on periphery thereof, and thereby for enabling correct estimation of collision upon the moving object, but without annoying the driver of the vehicle. And, with this, there can be also achieved an effect being superior from a social viewpoint; i.e., increasing a utility of that collision avoidance assisting system for a vehicle, and also promoting widely spreading thereof, and in its turn, enabling more safe driving of the vehicle.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

First of all, explanation will be made on a collision avoidance assisting system for a vehicle, according to a first embodiment of the present invention, by referring to FIG. 1 attached. However, the collision avoidance assisting system 1 for a vehicle shown in this FIG. 1 is installed or mounted on a vehicle, such as, an automobile, etc., for example, and it assists that vehicle (hereinafter, being also called a "self-vehicle" or "self-car", simply) "v", to avoid collision upon a moving object, including a pedestrian (hereinafter, being also called "a person", simply).

Figure 1:
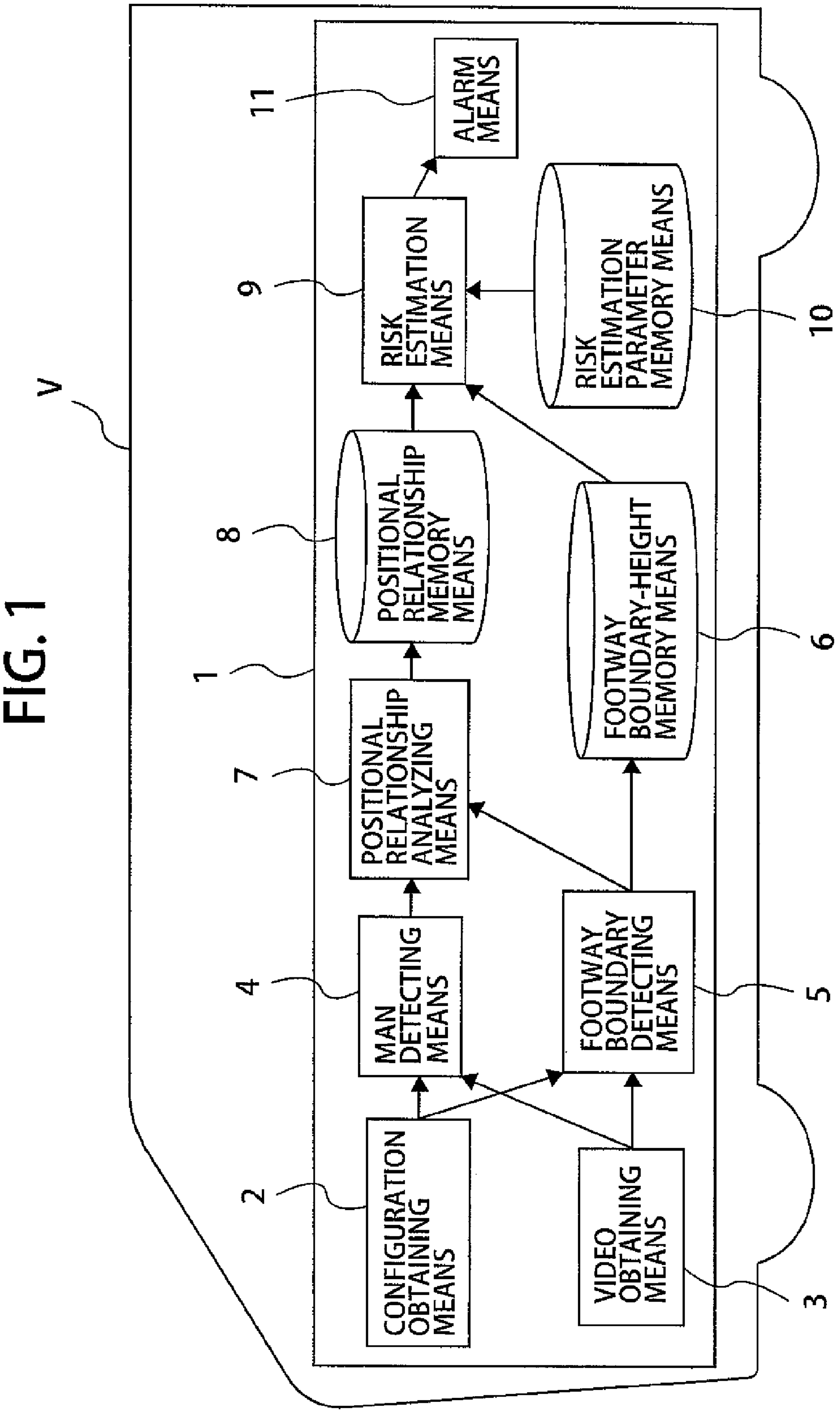
FIG. 1 is a block diagram for showing the structures of a collision avoidance assisting system for a vehicle, according to an embodiment 1 of the present invention.

The collision avoidance assisting system 1 for a vehicle is constructed with, as is shown in FIG. 1, a configuration obtaining means 2, a video obtaining means 3, a man detecting means 4, a footway boundary detecting means 5, a footway boundary height memory means 6, a position relationship analyzing means 7, a position relationship memory means 8, a risk estimation means 9, a risk estimation parameter memory means 10, and an alarm means 11.

Among the constituent elements mentioned above, first of all, the configuration obtaining means 2 is an area measurement sensor for obtaining configuration information of an environment around the self-car. In more details, there may be applied a stereo camera or a laser scanner, or a radar, etc. This configuration obtaining means 2 is so provided as to measure the configuration information of the self-vehicle "v" in an advancing direction thereof.

The video obtaining means 3 is a camera for obtaining at least either one of video information, among pictures or videos of a visible light and thermal imagery. A range of measurement of this video obtaining means 3 is so set up that, at least, it overlap upon the range of measurement of the configuration obtaining means 2.

The man detecting means 4 detects a position of the person (i.e., the moving object) "m" existing on periphery of the self-vehicle "v", in particular, a relative position from the self-vehicle "v", with using at least either one of the configuration information, which is obtained by the configuration obtaining means 2 mentioned above, and the video information, which is obtained by the video obtaining means 3 mentioned above. However, the more details of a detecting method/apparatus for that purpose is already known, in the conventional technologies, and there may be applied a technology, which is proposed in Japanese Patent Laying-Open No. 2005-234694 (2005), for example.

The footway boundary detecting means 5 detects a driveway/footway boundary, through recognition of the relative position from the self-vehicle "v", and further the configuration, including a height thereof, etc., regarding so-called an object on the footway boundary (hereinafter, being called "a footway boundary object), including a road facility "g", such as, a road edge difference or a guardrail or a hedge, etc., or a division line "c" by a white line or the like on the road, etc., for example, with using at least either one of the configuration information, which is obtained by the configuration obtaining means 2 mentioned above, and the video information, which is obtained by the video obtaining means 3 mentioned above. Thus, it detects the relative position from the self-vehicle "v" and the configuration of the footway boundary object. In addition thereto, the footway boundary detecting means 5 has an object attribute discriminating function for detecting an attribute, including at least either one of a kind or a material thereof, about the footway boundary object including the road facility in the periphery of that self-vehicle. However, also the more details of a detecting method/apparatus for that purpose is already known, in the conventional technologies, and therefore it can be achieved by applying a technology therein, which is proposed in Japanese Patent Laying-Open No. 2007-30551 (2007), for example.

The footway boundary height memory means 6 memorizes the height information of the footway boundary object therein, which is detected by the footway boundary detecting means 5 mentioned above. Herein, an expression of the height information is made by a two-dimensional configuration, which is obtained by projecting the footway boundary object on a plane, for example, and a height "h" of the footway boundary object at each position. This expression method is a technique, which is called an elevation map or 2.5 dimensional expression, etc.

The position relationship analyzing means 7 analyzes the positional relationship of at least two (2) or more of the positions, among the position of the person "m", the position of the footway boundary object, and the position of the self-vehicle "v", with using at least one (1) or more of the relative position from the self-vehicle "v" of the person (i.e., the moving object), who is detected by the man detecting means 4 mentioned above, and the relative position from the self-vehicle "v" of the footway boundary object, which is detected by the footway boundary detecting means 5 mentioned above, and the configuration thereof.

The position relationship memory means 8 memorizes therein the positional relationships among the position of the person "m", the position of the footway boundary object and the position of the self-vehicle "v", which are calculated by the position relationship analyzing means 7 mentioned above. As a more detailed example thereof, it memorized therein a distance "w" between the person and the footway boundary, a distance "d" between the person and that self-vehicle, and a distance "s" between the self-vehicle and the footway boundary.

The risk estimation means 9 estimates a risk "r" of collision between the self-vehicle "v" and the person "m", for each person "m", who is detected by the man detecting means 4 mentioned above. However, an $i^{th}$ person "m" is expressed by a person "m(i)", and the risk for the person "m(i)" is expressed by a risk "r(i)". Also, by summing up the risks "r(i)" for more than one person, it is also possible to obtain a total risk "R". Further, the risk estimation parameter memory means 10 memorizes therein risk estimation parameters, to be used when the risk estimation means 9 mentioned above estimates the risk "r".

And, the alarm means 11 conducts calling of attention to the driver of the self-vehicle "v", upon basis of at least either one of the risk "r(i)" and the total risk "R", which are estimated by the risk estimation means 9 mentioned above.

Figure 2:
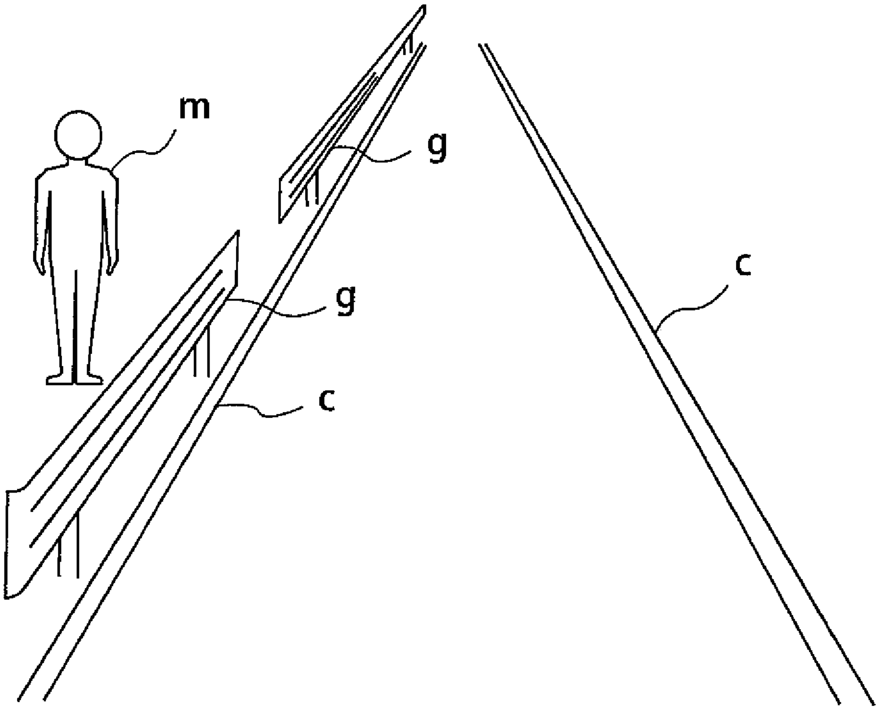
FIG. 2 is a view for showing an example of road circumstances, in which an implementation of the collision avoidance assisting system according to the embodiment 1 can be assumed.

Next, in FIG. 2 attached herewith is shown an example of the road circumstances, in which an implementation of the collision avoidance assisting system 1 for a vehicle can be assumed, the structures of which are explained in the above. The collision avoidance assisting system 1 for a vehicle, as was mentioned previously, is mounted on that self-vehicle "v", and a road, as a targeting herein, is so-called, an open or general road, other than a highway or the like. Thus, on the general road, the driveway and the footway are neighboring with each other, and the road facility "g" is provided on the driveway/footway boundary, such as, the guardrail, etc., for example. Also, there exists a person "m", such as, the pedestrian, etc. And, there may be a case where the division line "c" is provided with a white line or the like, on the road.

Figure 3:
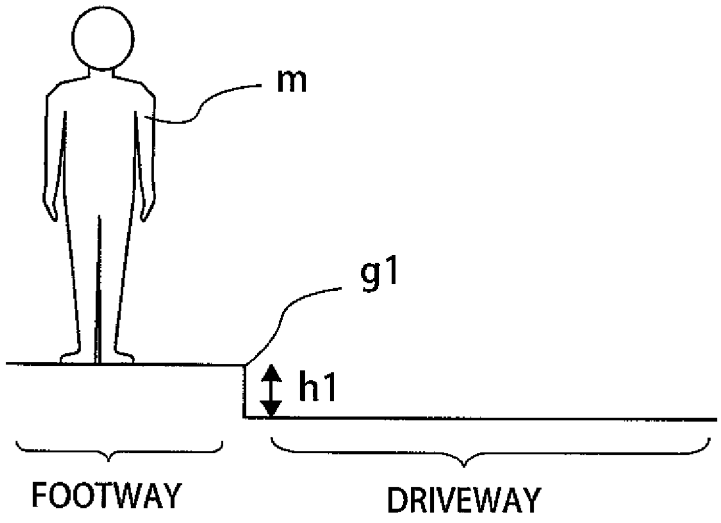
FIG. 3 is a side view for showing a relationship of an assumed road condition mentioned above, in particular, between a pedestrian and the drive way/foot way boundary.
Figure 4:
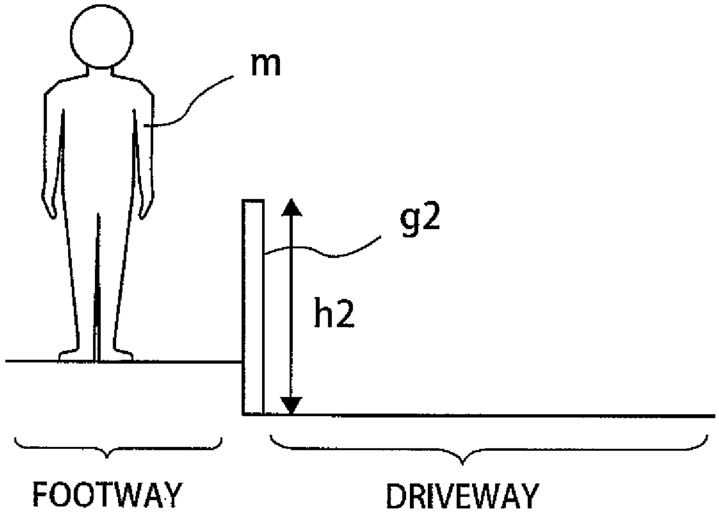
FIG. 4 is a side view for showing a relationship of an assumed road condition mentioned above, in particular, between a pedestrian and the drive way/foot way boundary.

Next, by referring to the side views of the road circumstances shown in FIGS. 3 and 4 attached herewith, explanation will be made on information, which is memorized in the footway boundary height memory means 6 mentioned above, i.e., the details of the height information of the footway boundary object. Further, those FIGS. 3 and 4 show the scenes different from each other. However, in those FIGS. 3 and 4, herein it is assumed that the self-vehicle "v", mounting the collision avoidance assisting system 1 for a vehicle not shown in the figure thereon, runs on a road, in common. Also, though not showing all of them, but on an actual driveway/footway boundary, there are so-called the road facilities "g", such as, the road edge difference or the guardrail or the hedge, etc., and/or the footway boundary objects, such as, the division line "c" of a white line or the like. In the example shown in FIG. 3, on the driveway/footway boundary is provided the road edge difference as the road facility "g1". Also, in the example shown in FIG. 4 is provided the guardrail, as the road facility. However, in those figures, on the footway does exist the person "m", in common.

Then, as was mentioned previously, the footway boundary detecting means 5 acknowledges the relative position from the self-vehicle "v" and the configuration including the height thereof, etc., regarding the footway boundary objects, i.e., the road facilities "g", such as, the road edge difference, the guardrail, or the hedge, etc., and the division line "c" of white line, etc., which are provided on the driveway/footway boundary. Further, the height information of the footway boundary object, which is memorized in the footway boundary height memory means 6, is a height "h" of that road facility "g", in case where there is a road facility "g". On the other hand, there is no road facility "g", but the footway boundary can be detected, with only the division line "c", for example, then the height "h" comes to be "0".

In the example shown in FIG. 3 mentioned above, since there is provided the road edge difference as the road facility "g1", the height "h1" is the height of the road edge difference "h1". Also, in the example shown in FIG. 4 mentioned above, since the guardrail is provided as the road facility "g2", then the height "h2" is the height of the guardrail "h2".

Following to the above, explanation will be made, in more details thereof, upon the elements building up the collision avoidance assisting system 1 for a vehicle mentioned above, i.e., the position relationship analyzing means 7 and the position relationship memory means 8. In particular, this position relationship analyzing means 7 is distinctive constituent element in the present invention, and as was mentioned previously, it analyzes at least two (2) or more of the positional relationships among the position of the person "m", the position of the footway boundary object and the position of the self-vehicle "v", with using at least one (1) or more of the relative position from the self-vehicle "v" of the person (i.e., the moving object), who is detected by the man detecting means 4, and the relative position from the self-vehicle "v" of the footway boundary object, which is detected by the footway boundary detecting means 5, and the configuration thereof.

Figure 5:
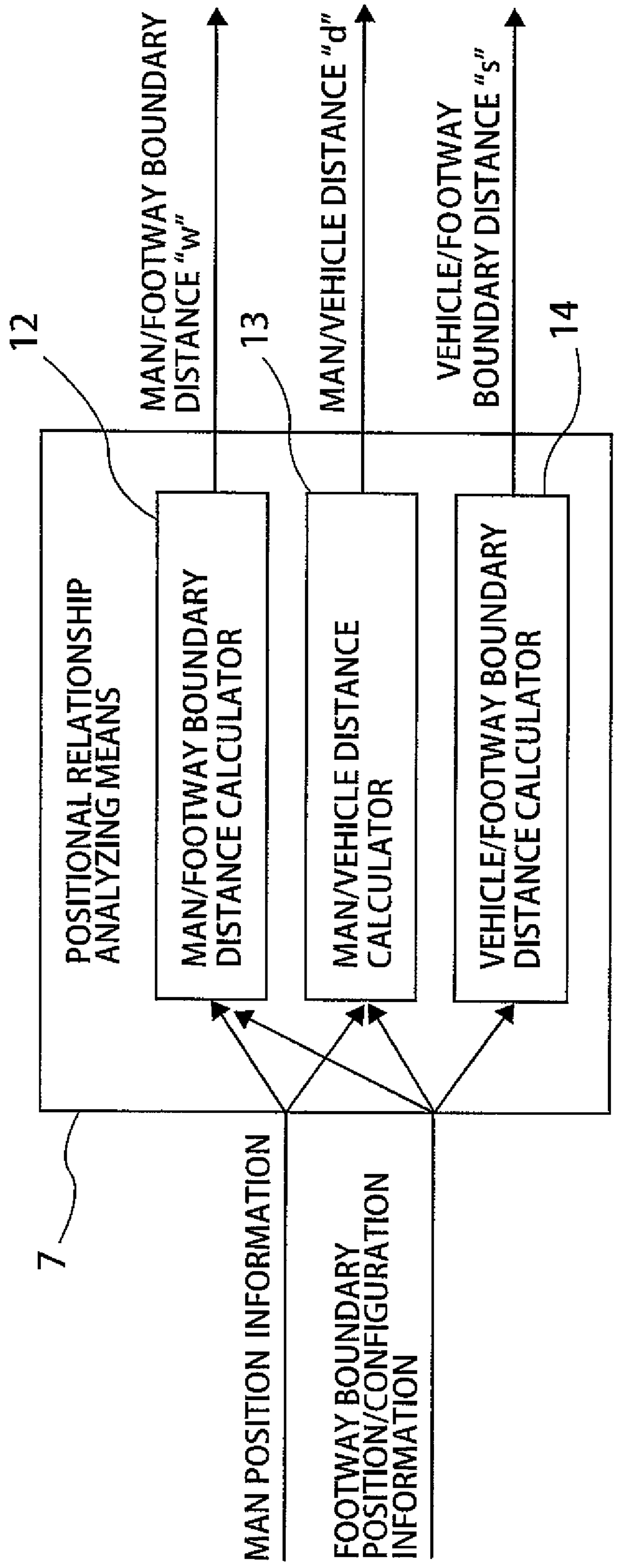
FIG. 5 is a block diagram for showing the internal structures of a position relationship analyzing means in the embodiment 1 mentioned above.

Herein, in FIG. 5 attached herewith is shown an example of the internal structures of the position relationship analyzing means 7 mentioned above. As is apparent from the figure, this position relationship analyzing means 7 is constructed with a man/footway boundary distance calculator 12, a man/self-vehicle distance calculator 13, and a self-vehicle/footway boundary distance calculator 14. And, into this position relationship analyzing means 7 is inputted the information relating to the relative position from the self-vehicle "v" of the person "m", who is detected by the man detecting means 4, and the information relating to the relative position from the self-vehicle "v" of the footway boundary object, which is detected by the footway boundary detecting means 5, and the configuration thereof.

Also, the man/footway boundary distance calculator 12 obtains the distance "w" between the person and the footway boundary, the man/self-vehicle distance calculator 13 obtains the distance "d" between the person and the self-vehicle, and the self-vehicle/footway boundary distance calculator 14 obtains the distance "s" between the self-vehicle and the footway boundary, respectively, so as to output them. Further, in case where the man detecting means 4 detects more than one person, the distance "w" between the person and the footway boundary, and the distance "d" between the person and the self-vehicle are obtained, for each person "m" detected. And, the position relationship memory means 8 memorized into an inside thereof, the positional relationship among the person "m", the footway boundary object and the self-vehicle "v", which are detected by the position relationship analyzing means 7 mentioned above. In more details, it memorizes the distance "w" between the person and the footway boundary, the distance "d" between the person and the self-vehicle and the distance "s" between the self-vehicle and the footway boundary.

Figure 6:
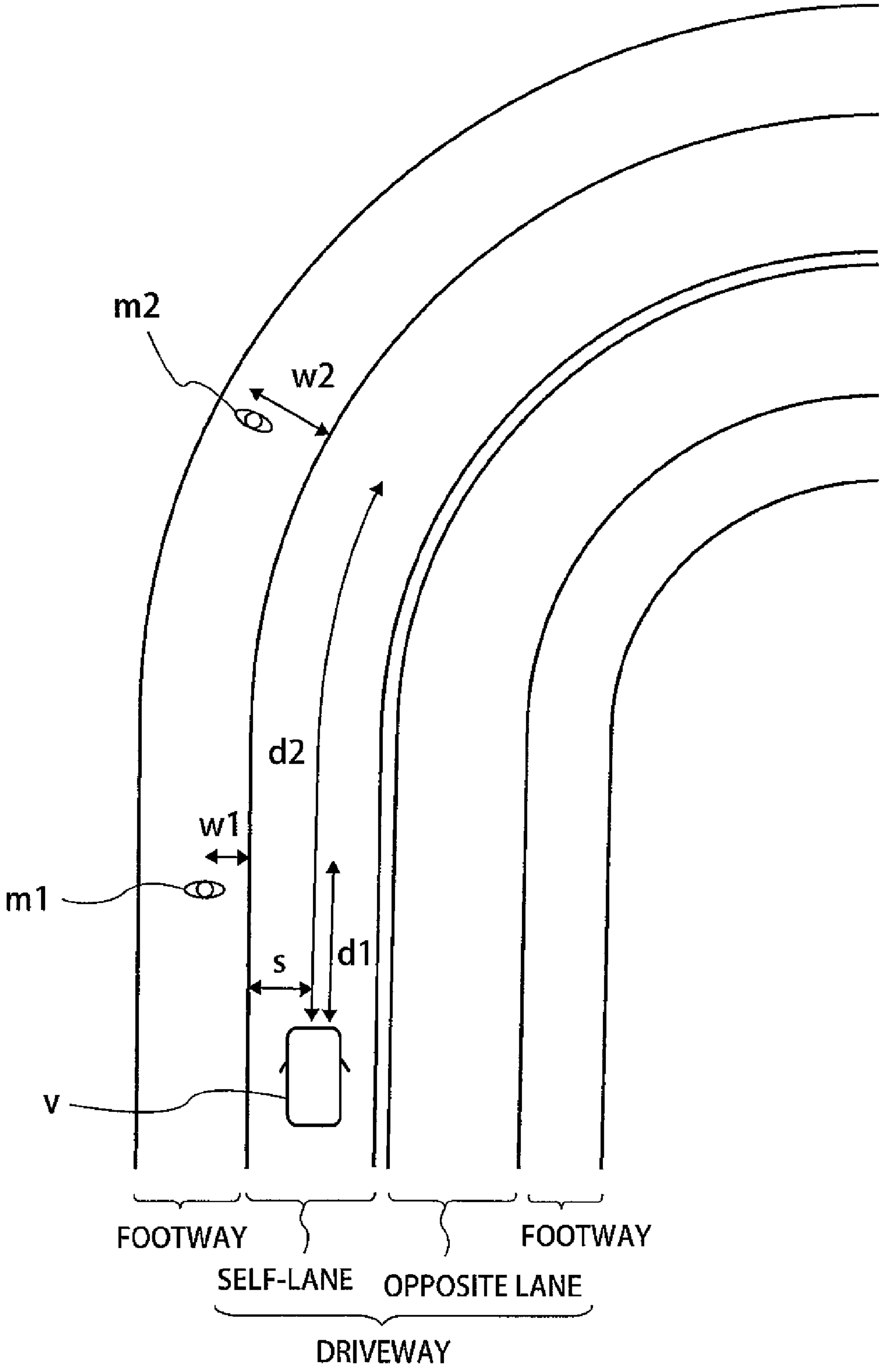
FIG. 6 is a plane view for showing an example of road circumstances, in which an implementation of the collision avoidance assisting system according to the embodiment 1 can be assumed.

Next, by referring to the plane view of the road circumstances shown in FIG. 6 is shown a detailed example of the positional relationship analysis, which is conducted by the position relationship analyzing means 7 mentioned above.

However, in the example shown in FIG. 6, the collision avoidance assisting system 1 for a vehicle, the structures of which are explained in the above, is mounted on the self-vehicle that exists on the driveway. Also, on the footway exists the person "m", and in the example in this FIG. 6, two (2) persons, i.e., a person "m1" and a person "m2" exist on the footway.

In the road circumferences shown in this FIG. 6, the man/footway boundary distance calculator 12 in the position relationship analyzing means 7 obtains the distance "w" between the person and the footway boundary, with using the relative position from the self-vehicle "v" of the person "m", who is detected by the man detecting means 4, and the relative position from the self-vehicle "v" of the footway boundary object, which is detected by the footway boundary detecting means 5, and the configuration thereof. This distance "w" between the person and the footway boundary is the distance from the person "m" up to the nearest footway boundary object. In more details, in the example shown in FIG. 6, the distance "w1" between the person and the footway boundary for the person "m1" and the distance "w2" between the person and the footway boundary for the person "m2" are obtained. However, calculation of the distance can be achieved with using a numerical value calculating method or the like. Also, in case where a person "m" exists on the footway, the distance "w" between the person and the footway boundary can be expressed by a positive numerical value, but on the other hand, in case where the person "m" exists on the driveway, for example, then exceptionally, the distance "w" between the person and the footway boundary may be expressed by a negative numerical value, for example.

Next, the man/self-vehicle distance calculator 13 in the position relationship analyzing means 7 obtains the distance "d" between the person and the self-vehicle along the footway boundary, with using the relative position from the self-vehicle "v" of the person "m", who is detected by the man detecting means 4, and the relative position from the self-vehicle "v" of the footway boundary object, which is detected by the footway boundary detecting means 5, and the configuration thereof. This distance "d" between the person and the self-vehicle along the footway boundary is, in other words, the distance "d" between the person and the self-vehicle along a car lane of the self-vehicle "v". In the example shown in this FIG. 6, the distance "d1" between the person and the self-vehicle for the person "m1" and the distance "d2" between the person and the self-vehicle for the person "m2" are obtained. Calculation of the distance can be achieved with using a numerical value calculating method or the like.

Also, the self-vehicle/footway boundary distance calculator 14 in the position relationship analyzing means 7 obtains the distance "s" between the self-vehicle and the footway boundary, with using the relative position from the self-vehicle "v" of the footway boundary object, which is detected by the footway boundary detecting means 5, and the configuration thereof. This distance "s" between the self-vehicle and the footway boundary is the distance from the self-vehicle "v" up to the nearest footway boundary object. Calculation of the distance can be achieved with using a numerical value calculating method or the like. However, in case where that self-vehicle "v" exists on the driveway, the distance "s" between the self-vehicle and the footway boundary can be expressed by a positive numerical value, but on the other hand, in case where that self-vehicle exists on the footway, then the distance "s" between the self-vehicle and the footway boundary may be expressed by a negative numerical value, exceptionally.

Next, detailed explanation will be given on the risk estimation means 9 and the risk estimation parameter memory means 10, i.e., the elements for building up the collision avoidance assisting system 1 for a vehicle, hereinafter.

The risk estimation means 9 estimates the risk "r" of collision between the self-vehicle "v" and the person "m", for each person "m" who is detected by the man detecting means 4. Also, as was mentioned previously, the total risk "R" may be obtained by summing up the risks "r(i)" of the plural number of persons "m". Further, the risk estimation parameter memory means 10 memorizes therein the risk estimation parameters to be used when the risk estimation means 9 estimates the risk "r". However, this risk estimation parameter may be a weighting coefficient for estimating the risk "r" or a default value of the risk "r" for a person, and a numerical value thereof is determined in advance, to be memorized.

Following to the above, explanation will be made on an actual example of detailed calculating equations to be used when the risk estimation means 9 mentioned above estimates the risk "r". Herein, it is considered to calculate the risk "r(i)" corresponding to the person "m(i)", in case where the $i^{th}$ person "m" exists on the periphery of that self-vehicle "v". However, it means that the larger the numerical value of this risk "r(i)", the higher the risk that the person "m(i)" and that self-vehicle "v" collide on.

Also, herein, each of variables, which are memorized in the footway boundary height memory means 6 and the position relationship memory means 8, is defined as below. Those variables are obtained by the risk estimation means 9, from the footway boundary height memory means 6 and the position relationship memory means 8.

h(i): height "h" of the footway boundary object nearest to the person "m(i)";

w(i): man/footway boundary distance "w" from the person "m(i)" up to the nearest footway boundary object;

d(i): man/self-vehicle distance "d" along a car lane of that self-vehicle "v", from the person "m(i)" to that self-vehicle "v"; and s: self-vehicle/footway boundary distance "s" of that self-vehicle "v".

Also, the risk estimation coefficients K1, K2, K3 and K4 are determined as blow. For those coefficients, arbitrary positive numerical values are determined in advance, respectively, and memorized in the risk estimation parameter memory means 10.

K1: a risk estimation coefficient for the height "h" of the footway boundary object;

K2: a risk estimation coefficient for the person/footway boundary distance "w";

K3: a risk estimation coefficient for the person/self-vehicle distance "d"; and K4: a risk estimation coefficient for the self-vehicle/footway boundary distance "s".

However, with the present embodiment, it is meant that the larger the value of each risk estimation coefficient, the larger the weight of an effect of lowering the risk down, due to that element when estimating the risk.

Values of the risk parameters, such as, K1 and K2, etc., may be changed in advance, depending upon a driving capacity of the self-vehicle "v", the weather, a maintenance condition, etc., for example. For example, in cases where braking performance of the self-vehicle "v" is low, or when it is estimated that a braking distance is long depending on the weather or the road condition, for example, then the value of K3 may be determined to be small. With this, it is possible to estimate that the risk is high, even if the distance is far, from the self-vehicle "v" up to the person "m(i)". Or alternately, it is also possible to change the values of the risk estimation parameters, with using the information, which can be detected by a function for discriminating the attribute of the object, being equipped with the footway boundary detecting means 5, i.e., including either one (1) of a kind or a material thereof, regarding the footway boundary object including the road facility on the periphery of that self-vehicle.

Further, the default risk "r" for the person "m" is determined to be "D". An arbitrary positive constant is determined, in advance, as a definite numerical value thereof, and that value is memorized in the risk estimation parameter memory means 10.

D: default risk "r" for the person "m".

Then, the risk estimation means 9 mentioned above is able to calculate the risk "r(i)" for the person "m(i)", by the following equation, for example. Each of the risk estimation parameters K1, K2, K3 and K4 and D is obtained by the risk estimation means 9 from the risk estimation parameter memory means 10.

$$R(i)=D-K1\times h(i)-K2\times w(i)-K3\times d(i)-K4\times s$$

However, in case where w(i) is the negative numerical value, since this means that the person "m(i)" is on the driveway climbing over the footway boundary object, then there cannot be expected an effect of lowering down the risk due to the footway boundary object. For this reason, it is preferable for the risk estimation means 9 to estimate the risk "r(i)", assuming that the value of K1 is "0", temporarily. In the similar manner, in case where the person "m(i)" exists on the driveway, since the risk is high, it is preferable for the risk estimation means 9 to estimate the risk "r(i)" of collision, while enlarging the value of K2, temporarily. Also, in case where "s" has the negative numerical value, it means that the self-vehicle "v" exists on the footway, and since the risk is high, then it is preferable for the risk estimation means 9 to estimate the risk "r(i)", while enlarging the value of K4, temporarily.

In this manner, it is possible to obtain the risk "r(i)" for the person "m(i)". However, the total risk "R", summing up of the risks "r(i)" for the plural number of persons, can be formulated as below. Thus, it means that the larger the numerical value of this total risk "R", the higher the risk of colliding the self-vehicle "v" on the person "m", in the condition thereof.

$$R=\Sigma ir(i)$$

Next, explanation will be given on the alarm means 11, being one (1) of elements for building up the collision avoidance assisting system 1 for a vehicle, hereinafter.

The alarm means 11 calls attention to the driver of the self-vehicle "v", at least upon basis of either one of the risk "r(i)" and the total risk R, which are estimated by the risk estimation means 9. However, as a concrete method for calling attention to the driver may be applied the existing methods; such as, drawing a character(s) or a diagram(s) on a display, which is mounted within the self-vehicle "v", lightening or blinking the alarm lamp, outputting an alarm sound from an alarm speaker (a siren), or using an automatic brake, etc., for example. Or, among those methods mentioned above, not only one of the method for calling attention, but a plural number thereof may be combined with, to be applied.

However, for the alarm means 11 mentioned above, it is preferable to have such the structure that it can change contents of the method for calling attention, depending on at least either one of the values, between the risk "r(i)" and the total risk "R". In more details, it may have the structures for changing sizes, colors and/or forms of the character(s) or the diagram(s) when drawing the character(s) or the diagram(s) on the display. Also, it may have the structures for changing an amount of lights, colors, a blinking period thereof, etc., when conducting the lightening or blinking of the alarm lamp. Or, it may have the structures for changing a volume of sounds and/or tones, etc., when applying a siren therein, which outputs an alarm sound from an alarm speaker thereof. When applying the automatic brake therein, it may have the structures for changing strength of brake and/or a period of strengthen and weaken the automatic brake, etc. In this manner, for the alarm means 11, it is preferable to have the structures for enabling to change the contents of calling attention, depending on at least either one of the risk "r(i)" and the total risk "R".

With the collision avoidance assisting system 1 for a vehicle, being constructed as was mentioned above, according to the above embodiment 1, not only detecting the existence of the person "m", but also estimating the risk "r" of colliding between the person "m" and the self-vehicle "v", depending on the person "m" and a peripheral environment (or a peripheral circumstance) thereof; i.e., also by taking the so-called the footway boundary object (s), for example, the road facilities "g", such as, the road edge difference or the guardrail or the hedge, etc., and also the division line "c" of white line, etc., into the consideration thereof, it is possible to predict the collision upon the person "m", i.e., the moving object, including, such as, the pedestrian or the like, correctly, in other words, an accuracy for determining the risk "r" of collision is increased much higher, and therefore it is possible to achieve the collision avoidance assisting system 1 for a vehicle, for enabling to generate an alarm being useful/effective to the driver, but without annoying the driver therewith.

Embodiment 2

Next, detailed explanation will be made on the collision avoidance assisting system for a vehicle, according to an embodiment 2, hereinafter, by referring to FIG. 7 attached herewith. This FIG. 7 shows therein the structures of the collision avoidance assisting system 1 for a vehicle, according to a second embodiment, i.e., the embodiment 2, of the present invention, but the constituent elements similar to those of the embodiment 1 are shown with attaching the same reference numerals, and the detailed explanations thereof will be omitted herein.

In the structures of the collision avoidance assisting system 1 for a vehicle shown in FIG. 1 mentioned above, the footway boundary detecting means 5 detects the position of the footway boundary object, including the road facility "g", such as, the road edge difference or the guardrail or the hedge, etc., and/or the division line "c" of the white line, etc., and further the configuration thereof, including the height thereof, with using at least either one of the configuration information, which is obtained by the configuration obtaining means 2, and the video information, which is obtained by the video obtaining means 3. On the contrary to this, according to the present embodiment 2, the footway boundary detecting means 5 detects the footway boundary object, with using a method different from that of the embodiment 1.

Figure 7:
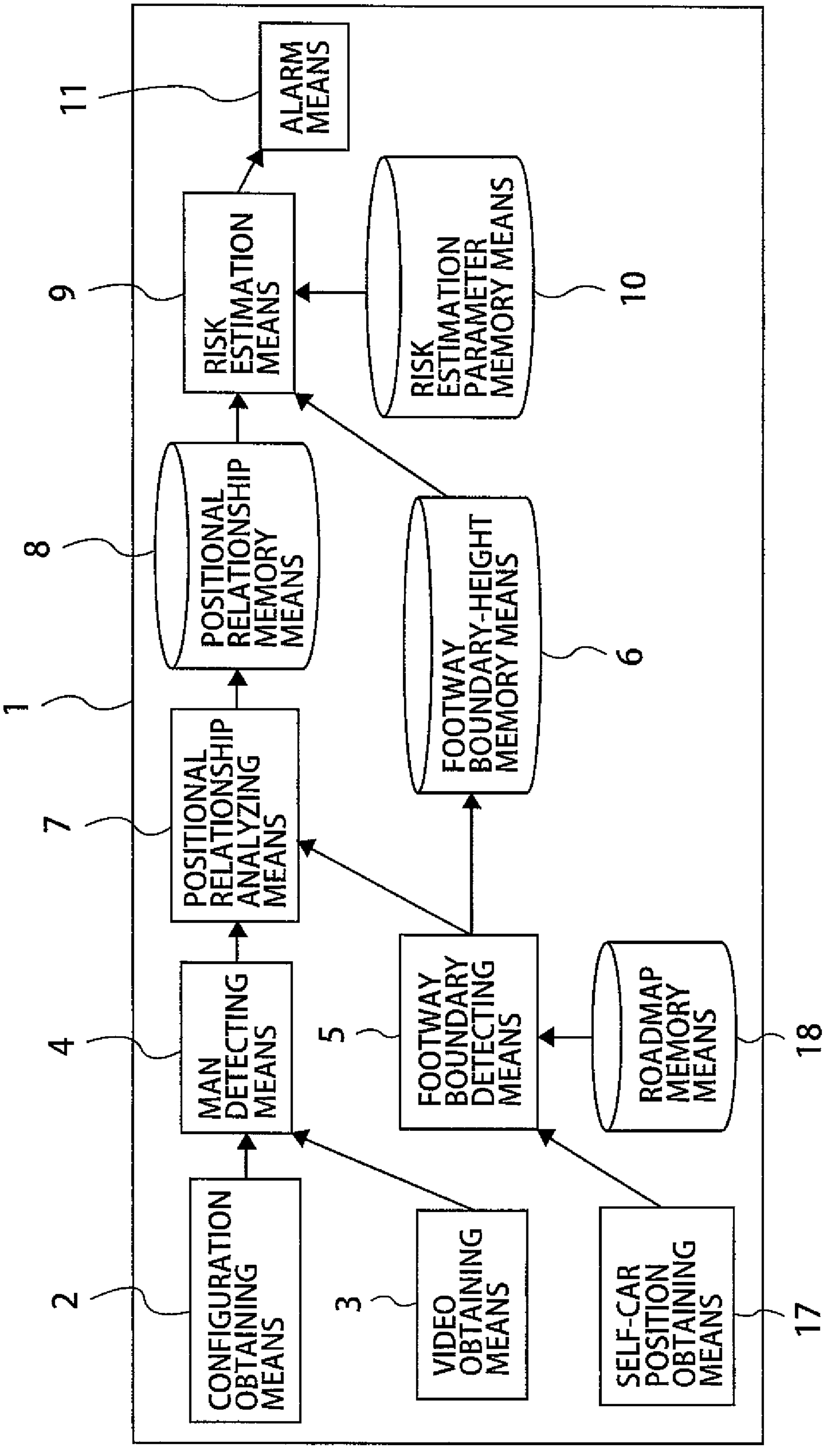
FIG. 7 is a block diagram for showing the structures of a collision avoidance assisting system for a vehicle, according to an embodiment 2 of the present invention.

Thus, in FIG. 7, the collision avoidance assisting system 1 for a vehicle includes, in addition to the footway boundary detecting means 5 for detecting the footway boundary object, with using the method different from that of the embodiment 1 mentioned above, further therein, a self-vehicle position obtaining means 17 and a road map memory means 18.

The self-vehicle position obtaining means 17 obtain the position of the self-vehicle "v", on which the collision avoidance assisting system 1 for a vehicle is mounted. Further, in more details thereof, the method/apparatus for obtaining the position of the self-vehicle "v" is/are already well-known technologies, and a RTK-GPS, for example, may be applied in this self-vehicle position obtaining means 17.

Also, the road map memory means 18 memorizes therein a road map of the environment where the self-vehicle “v” travels. However, as this road map is applied a high accuracy road map memorizing therein, not only the driveways, but also the information of the footways and also so-called the footway boundary objects, including the road facilities “g”, such as, the road edge difference or the guardrails or the hedges, etc., and further the division line “c” of white line, etc. For example, there may be applied “a numerical value map (edited by Geographical Survey Institute)”, being in an accuracy of a “cm” order, and also having attribute information of the footway boundary objects.

With the collision avoidance assisting system 1 for a vehicle mentioned above, together with the self-vehicle position obtaining means 17 and the road map memory means 18, the footway boundary detecting means 5 is able to detect the position and the configuration of the footway boundary object including the road facility “g”, such as, the road end difference or the guardrail or the hedge, etc., in the periphery of the self-vehicle “v” and/or the division line “c” of white line, etc., by referring to the periphery of the position of the self-vehicle “v”, which is obtained by the self-vehicle position obtaining means 17, among the road maps, which are memorized within the road map memory means 18. With the collision avoidance assisting system 1 for a vehicle, being constructed as was mentioned above, it is possible to achieve the collision avoidance assisting system 1 for a vehicle, easily, having the footway boundary detecting means 5 for enabling to detect the footway boundary object correctly, through detection of the position of the self-vehicle “v” by the vehicle-itself position obtaining means 17.

Embodiment 3

Next, detailed explanation will be made on the collision avoidance assisting system for a vehicle, according to the embodiment 3, hereinafter. However, the constituent elements of the collision avoidance assisting system 1 for a vehicle, according to a third embodiment, i.e., the embodiment 3 of the present invention, are basically similar to those of the embodiment 1 mentioned above, though the detailed explanation thereof will be omitted herein, but it differs from that, in particular, in the man/footway boundary distance calculator 12 (see FIG. 5), which is provided within the position relationship analyzing means 7, and variations thereof will be explained by referring to FIGS. 8 to 10 attached herewith.

As was mentioned previously, the man/footway boundary distance calculator 12 provided within the position relationship analyzing means 7 obtains the person/footway boundary distance “w”, with using the relative position from the self-vehicle “v” of the person “m”, who is detected by the man detecting means 4, the relative position from the self-vehicle “v” of the footway boundary object, which is detected by the footway boundary detecting means 5, and the configuration thereof. However, for example, due to influences of measurement error thereof, an error is included within the person/footway boundary distance “w”. Herein, in particular, in case where the person/footway boundary distance “w” is near to “0”, for example, there is a possibility that a true value of the person/footway boundary distance “w” is a negative numerical value, depending on the influences of that error, even if the value of the person/footway boundary distance “w”, which is obtained by the man/footway boundary distance calculator 12, has a positive numerical value. On whether the value of this person/footway boundary distance “w” is the positive one or the negative one, it means a difference that the person “m” exists on the footway or the driveway, and for that reason, the risk of collision differs largely, due to the difference between the positive one and the negative one. Then, in case where the person/footway boundary distance “w” is near to “0”, accurately determining a value of the person/footway boundary distance “w” to be positive or negative results into a correct estimation of the risk of collision between the person “m” and the self-vehicle “v”, then it is very important. Then, hereinafter, explanation will be made on a variation of the man/footway boundary distance calculator 12 for enabling to determine on whether the person “m” exists on the footway or the driveway, accurately, in case where the value of the person/footway boundary distance “w” is near to “0”.

Figure 8:
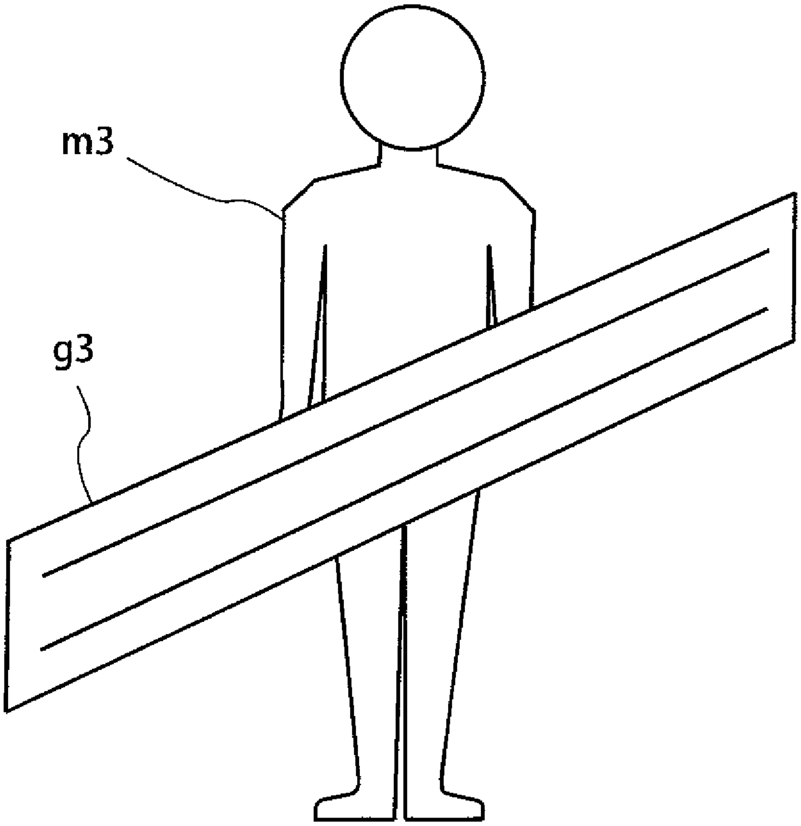
FIG. 8 is a view for showing an example of pictures, which are detected by a man detecting means, cutting out the periphery of the pedestrian, in the collision avoidance assisting system for a vehicle, according to an embodiment 3 of the present invention.

FIG. 8 attached herewith shows therein a picture or video, cutting out the person “m3” who is detected by the man detecting means 4 and the periphery thereof, among two-dimensional pictures, which are obtained by at least either one of the configuration obtaining means 2 (for example, a stereo camera), which is mounted on the self-vehicle “v”, and the video obtaining means 3. In the example shown in this figure, the road facility “g3” exists in vicinity of the person “m3” as the footway boundary object. However, in this example, although the guardrail is shown therein as the road facility “g3”, but in the place thereof, it may be other facility “g”, such as, the road edge difference or the hedge, etc., or the division line “c” of white line, etc., for example.

Figure 9:
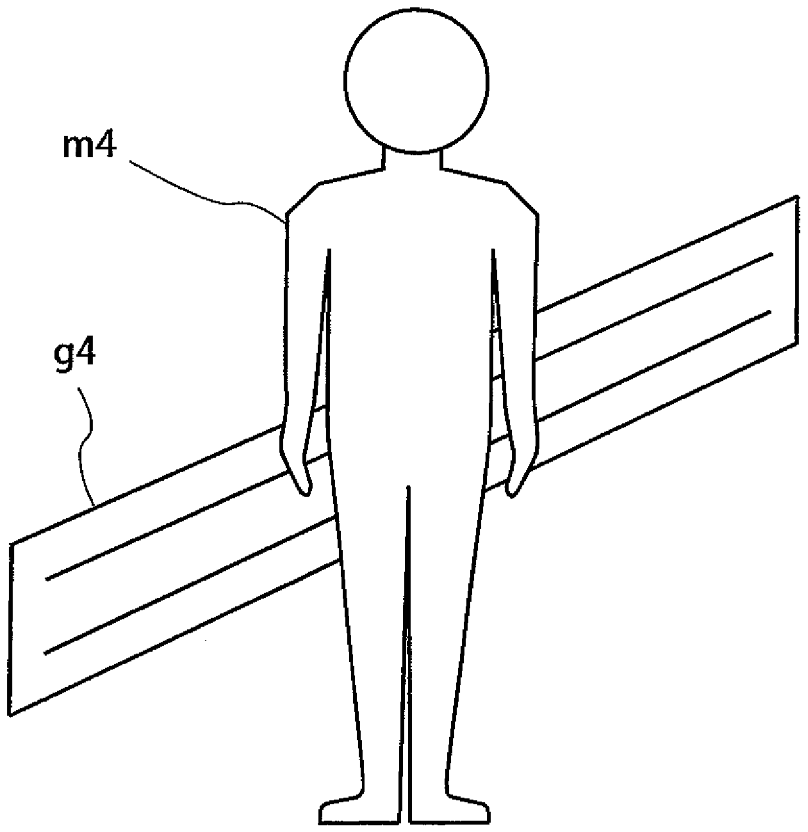
FIG. 9 is a view for showing other example of pictures, which are detected by the man detecting means, cutting out the periphery of the pedestrian, in the collision avoidance assisting system for a vehicle, according to the embodiment 3.

On the other hand, although FIG. 9 attached herewith is similar to that of FIG. 8 mentioned above; however, in different scenes, similar to that shown in FIG. 8 mentioned above, a picture is shown therein, cutting out the person “m4” who id detected by the man detecting means 4 and the periphery thereof, among two-dimensional pictures, which are obtained by at least either one of the configuration obtaining means 2 (for example, a stereo camera), which is mounted on the self-vehicle “v”, and the video obtaining means 3. In the example of this figure, in vicinity of the person “m4”, there exist the road facility “g4” as the footway boundary object. However, in this example, there is shown the guardrail as the road facility “g4”, but in the place thereof, it may be other facility “g”, such as, the road edge difference or the hedge, etc., or the division line “c” of white line, etc., for example.

Herein, comparing FIG. 8 and FIG. 9 mentioned above, first of all, in FIG. 8, the person “m3” exists in depth (in rear) of the road facility “g3”, seeing from the self-vehicle “v” not shown in the figure; i.e., it can be seen that the person “m3” is on the footway. On the other hand, in FIG. 9, the person “m4” exists in front (in forward) of the road facility “g4”, seeing from the self-vehicle “v” not shown in the figure; i.e., it can be seen that the person “m4” is on the driveway. Namely, within the two-dimensional pictures, by recognizing that a region corresponding to the person “m” is divided by a region corresponding to the footway boundary object (FIG. 8), or that the region corresponding to the footway boundary object is divided by the region corresponding to the person “m” (FIG. 9), it is possible to determine whether the person “m” is on the footway, or on the driveway, by the man/footway boundary distance calculator 12.

Figure 10:
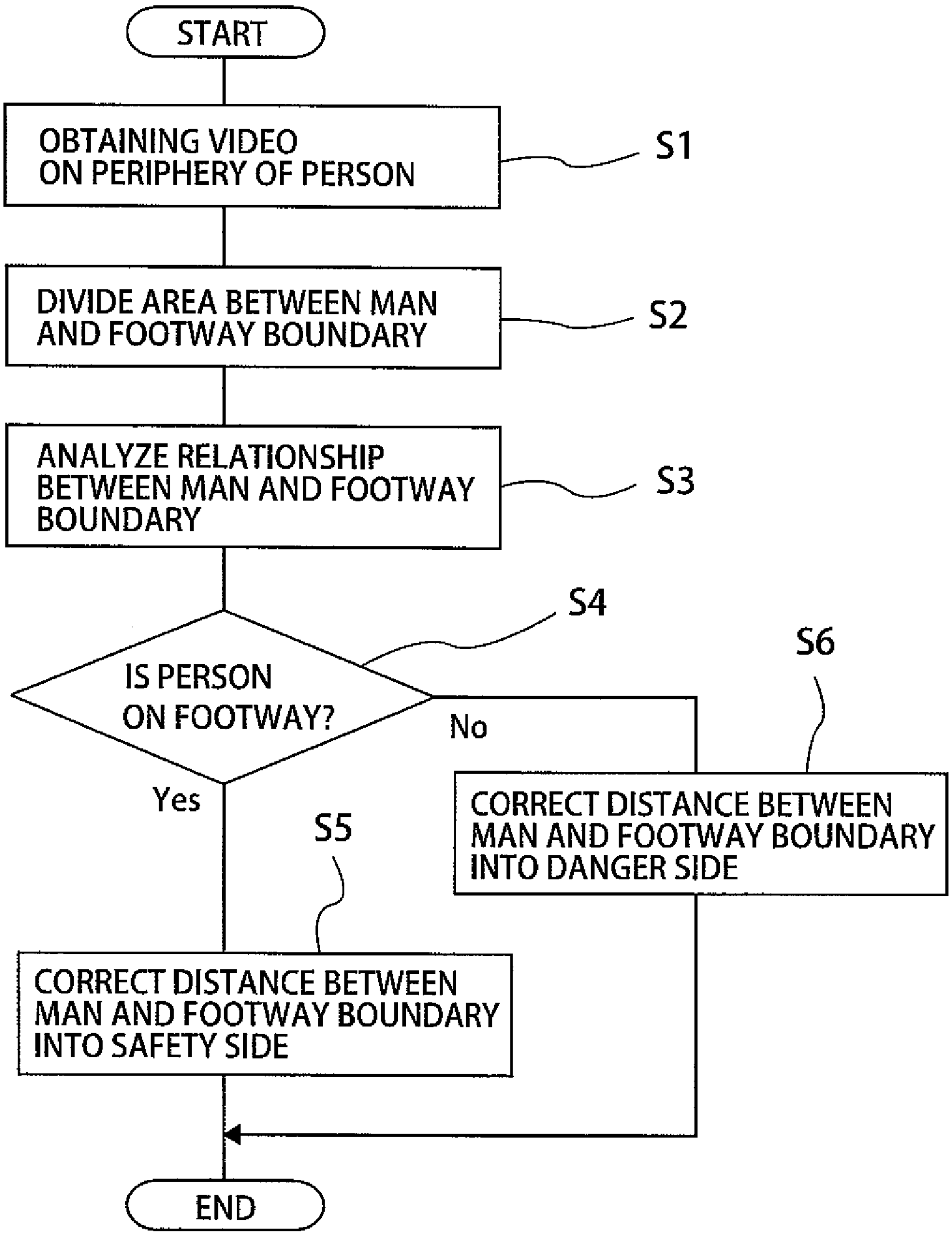
FIG. 10 is a flowchart for showing an example of processes for calculating out a distance between a man and a boundary of a footway, in the collision avoidance assisting system for a vehicle, according to the embodiment 3.

In FIG. 10 attached herewith is shown a flowchart of contents processing of the man/footway boundary distance calculator 12, for enabling to determine on whether the value of the person/footway boundary distance “w” is positive or negative, accurately, in particular, in case where the person/footway boundary distance “w” is near to “0”.

As an assumption, after when the man/footway boundary distance calculator 12 obtains the person/footway boundary distance "w", it is assumed that the footway boundary object detected by the footway boundary detecting means 5 exists in vicinity of the person "m" who is detected by the man detecting means 4. First of all, the man/footway boundary distance calculator 12 confirms on whether the person/footway boundary distance "w" is in the condition of being near to "0" or not. And, when enabling to confirm that it is that condition, the man/footway boundary distance calculator 12 executes the processing shown by the flowchart shown in FIG. 10. However, when the man detecting means 4 detects more than one person, the processing shown in the flowchart of FIG. 10 will be conducted, for each of the persons "m".

First of all, within the two-dimensional picture obtained by either one of the configuration obtaining means 2 (for example, a stereo camera) or the video obtaining means 3, the periphery of the person "m" detected by the man detecting means 4 is cut out (S1). For example, from the two-dimensional picture obtained, it is enough to cut out a rectangular region of a predetermined size surrounding around the person detected by the man detecting means 4, as a center thereof.

Next, the picture cut out is divided into a region of the person "m", a region of the footway boundary object, and other regions (S2). In this instance, with using the position of the person "m" detected by the man detecting means 4, and also the position and the configuration, which are detected by the footway boundary detecting means 5, it is possible to determine each region within the picture, to be divided from.

Following to the above, an analysis is made on a positional relationship between the person "m" and the footway boundary object, i.e., the person "m" is in depth of the footway boundary object or in front thereof (S3). However, this analyzing process can be conducted by recognizing on whether the region corresponding to the footway boundary object is divided by the region corresponding to the person "m" or not. As a concrete method thereof, a clustering process for the video may be used, for example.

Further, as a result of the processing in the step 3 mentioned above, it is determined on whether the person "m" is on the footway or on the driveway, depending on whether the person "m" is in depth of the footway boundary object or in front thereof (S4). And, in case when determining that the person "m" is on the footway ("Yes"), then the person/footway boundary distance "w" is adjusted or corrected to a safety side (S5). In more details, when the person/footway boundary distance "w" has a negative value, for example, it may be corrected to "0" or a positive numerical value. On the other hand, when determining that the person "m" is on the driveway ("No"), then the person/footway boundary distance "w" is adjusted or corrected to a danger side (S6). In more details, when the person/footway boundary distance "w" has a positive numerical value, for example, it may be corrected to "0" or a negative numerical value. However, the correction amount or predetermined correction amount to be applied in each correction in the steps S5 and S6 mentioned above, they are determined to appropriate values, in advance.

With the collision avoidance assisting system 1 for a vehicle, for conducting the above-mentioned processing contents, it is possible to determine an element of largely dominating the determination of the risk of collision, i.e., whether the person "m" is on the footway or on the driveway, with high accuracy, in particular, when the person/footway boundary distance "w" is near to "0" for some reason, which can be obtained with using the relative position from the self-vehicle "v" of the person "m" who is detected by the man detecting means 4, and the relative position from the self-vehicle "v" of the footway boundary object, which is detected by the footway boundary detecting means 5, and the configuration thereof, it is possible to predict the collision on the person "m", more correctly, in other words, increasing a determining accuracy "r" of the risk of collision much higher, and thereby enabling to realize the collision avoidance assisting system 1 for a vehicle, for enabling to generate a useful/effective alarm for the driver, but without annoying the driver.

Embodiment 4

Figure 12:
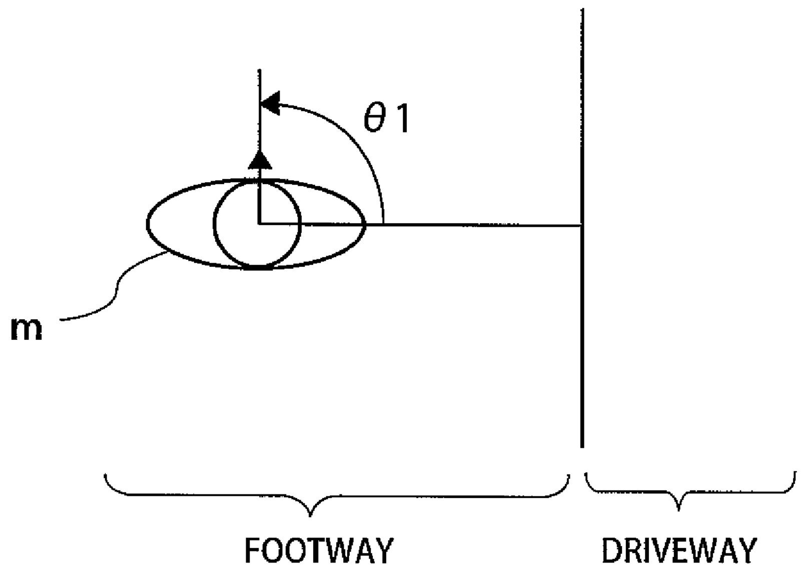
FIG. 12 is a plane view for showing an example of road circumstances, in which an implementation of the collision avoidance assisting system according to the embodiment 4 can be assumed.
Figure 13:
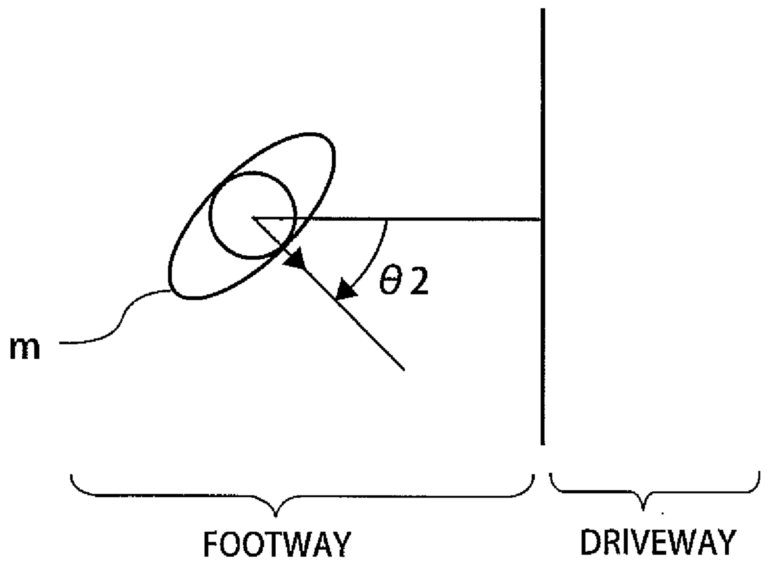
FIG. 13 is a plane view for showing an example of road circumstances, in which an implementation of the collision avoidance assisting system according to the embodiment 4 can be assumed.

Next, detailed explanation will be given on a collision avoidance assisting system for a vehicle, according to a fourth embodiment, by referring to FIGS. 11 to 13 attached herewith. However, in the present embodiment 4, as will be shown in FIG. 11, the collision avoidance assisting system 1 for a vehicle further comprises a man's direction detecting means 15 and a man's direction memory means 16, in addition to the constituent elements of the embodiment 1 mentioned above; i.e., the configuration obtaining means 2, the video obtaining means 3, the man detecting means 4, the footway boundary detecting means 5, the footway boundary height memory means 6, the position relationship analyzing means 7, the position relationship memory means 8, the risk estimation means 9, the risk estimation parameter memory means 10, and the alarm means 11. Further, in this figure, the same reference numerals same to those shown in FIG. 1 mentioned above show the constituent elements similar to those shown in the embodiment 1 mentioned above, and the detailed explanation thereof will be omitted herein.

However, within the structures of the collision avoidance assisting system 1 for a vehicle, which is shown in the embodiment 1 (FIG. 1) or the embodiment 2 (FIG. 7) mentioned above, there are used the position relationship among the person "m" and the footway boundary object and the self-vehicle "v", and the height "h" of the footway boundary object, as the elements for estimating the risk "r". On the contrary to this, according to the present embodiment 4, there is provided the structures of further adding a new element to the collision avoidance assisting system 1 for a vehicle, for estimating the risk "r".

Figure 11:
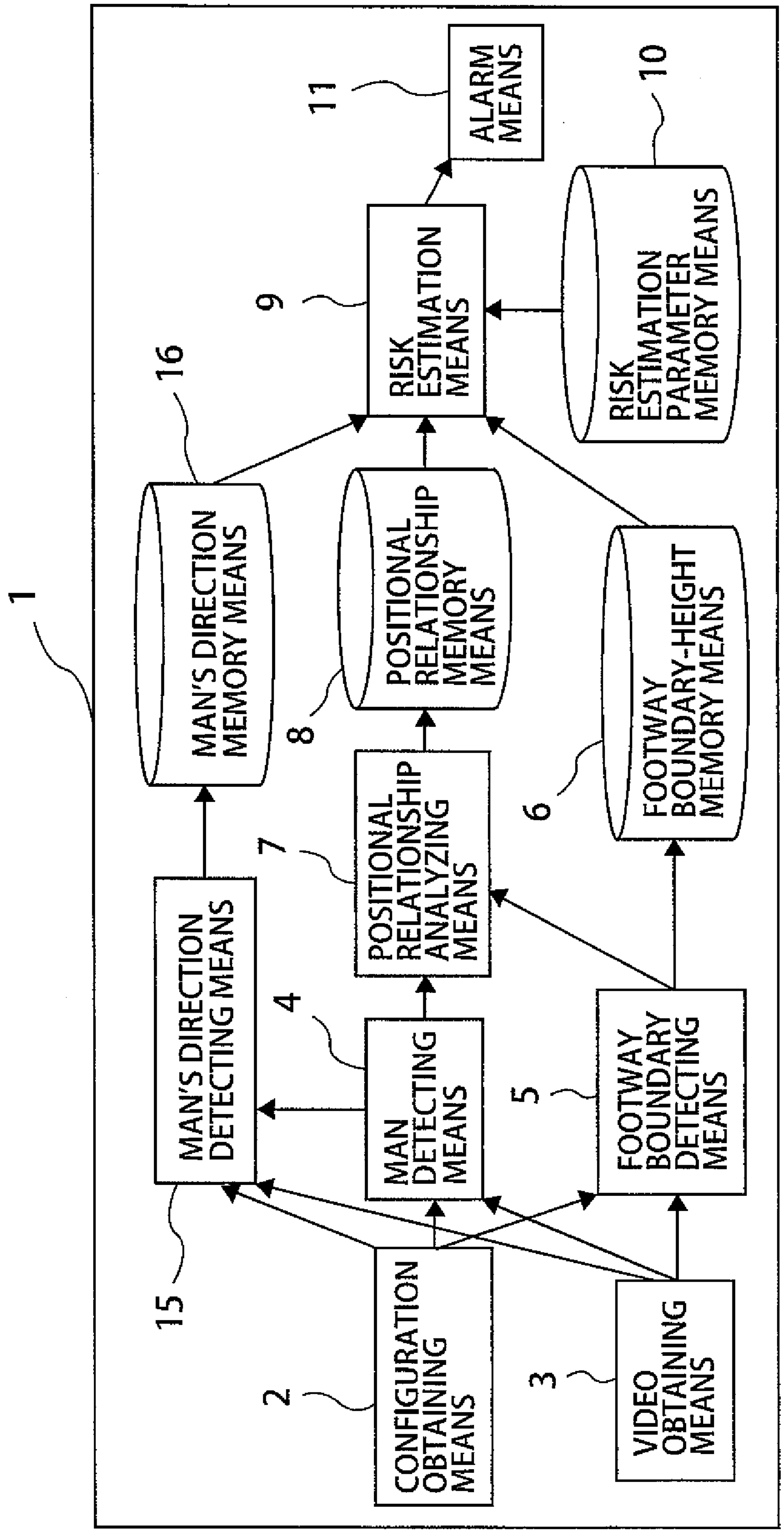
FIG. 11 is a view for showing an example of pictures, which are detected by a man detecting means, cutting out the periphery of the pedestrian, in the collision avoidance assisting system for a vehicle, according to an embodiment 4 of the present invention.

FIG. 11 shows the structures of the collision avoidance assisting system 1 for a vehicle, and in more details thereof, in addition to the structures of the collision avoidance assisting system 1 for a vehicle shown in FIG. 1, there are further provided the man's direction detecting means 15 and the man's direction memory means 16. Thus, further, adding the direction information of the person "m", as an element for estimating the risk "r", enables prediction of an action of the person "m", by also taking the direction into which the person "m" turns her/his face into the consideration, and thereby enabling an estimation of the risk "k" more strictly.

With such the structures as was mentioned above, the man's direction detecting means 15 detects a direction "θ" of the person "m" who is detected by the man detecting means 4, with using at least one (1) or more of the configuration information, which is obtained by the configuration obtaining means 2, the video information, which is obtained by the video obtaining means 3, and the position information of the person "m", which is detected by the man detecting means 4. Further, the detailed structure of such man's direction detecting means 15 is already described in Japanese Patent Laying-Open No. 2007-265367 (2007), for example, and therefore, please refer to that if necessary. This man's direction detecting means 15 obtains the direction "θ" for each of the persons "m" detected, when the man detecting means 4 detects more than one person.

The man's direction memory means 16 memorizes therein the man's direction information of the person "m", which is detected by the man's direction detecting means 15. Also this man's direction memory means 16 memorizes the direction "θ" for each of the persons "m", when the man detecting means 4 detects more than one person.

Further, explanation will be given on the details of the direction information of the person "m" to be memorized in the man's direction memory means 16, by referring to the plane views of circumferences shown in FIGS. 12 and 13 attached herewith. Those FIGS. 12 and 13 are plane views, each looking at the person "m" on the footway from the above, in different scenes, respectively.

However, an expression of the direction "θ" of the person "m" in those figures is made by an area of values ±180 deg, for example, while defining the direction from the footway to the driveway to be "0", on a straight-line perpendicular to the footway boundary nearest to the person "m". In the example shown in FIG. 12, the direction "θ" of the person "m" is expressed by +90 deg. And, in the example shown in FIG. 13, the direction "θ" of the person "m" is expressed by −45 deg.

Herein, turning back to FIG. 11, again, explanation will be given on the risk estimation means 9 and the risk estimation parameter memory means 10 in the collision avoidance assisting system 1 for a vehicle, including therein the man's direction detecting means 15 and the man's direction memory means 16, hereinafter.

First of all, explanation will be made on an actual example of a concrete calculation equation for estimating the risk "r" by the risk estimation means 9. Herein, it is considered to calculate the risk "r" corresponding to the person "m", for example, incase where the $i^{th}$ person "m" is in the vicinity of that self-vehicle "v". However, the meaning is also same to the above, i.e., the larger the numerical value of the risk "r(i)", the higher the risk of colliding that self-vehicle "v" upon the person "m(i)".

Herein, each of the variations, which are memorized in the footway boundary height memory means 6, the position relationship analyzing means 7, and the man's direction memory means 16, is defined as below. Those variations are obtained by the risk estimation means 9 from the footway boundary height memory means 6, the position relationship analyzing means 7 and the man's direction memory means 16.

h(i): height "h" of the footway boundary object nearest to the person "m";

w(i): man/footway boundary distance "w" from the person "m(i)" to the footway boundary object nearest thereto;

d(i): man/self-vehicle distance "d" along the car lane of that vehicle "v" from the person "m(i)" to that vehicle "v";

s: self-vehicle/footway boundary distance "s" of the vehicle "v"; and

θ(i): direction "θ" of the person "m(i)".

However, an absolute value of θ(i), being expressed by an area of values ±180 deg, is mentioned as |θ(i)|.

Also, the risk estimation coefficients K1, K2, K3, K4 and K5 are determined as below. For those coefficients, arbitrary values are determined in advance, respectively, and they are memorized in the risk estimation parameter memory means 10.

K1: a risk estimation coefficient for the height "h" of the footway boundary object;

K2: a risk estimation coefficient for the person/footway boundary distance "w";

K3: a risk estimation coefficient for the person/self-vehicle distance "d";

K4: a risk estimation coefficient for the self-vehicle/footway boundary distance "s"; and K5: a risk estimation coefficient for the direction "θ" of the person.

However, in the present embodiment, it is meant that the larger the value of each risk estimation coefficient, the larger the weight of an effect of lowering the risk due to that element when estimating the risk.

Values of the risk estimation coefficients, such as, K1 and K2, etc., may be changed in advance, depending on the drivability or driving capacity of the self-vehicle "v", or the weather, or maintenance condition of the road, etc. For example, in case where a braking capacity of the self-vehicle "v" is low, or in case where a braking distance can be assumed to be long depending on the condition of the weather or the road, the value of K3 is determined to be small. With doing this, it is possible to estimate the risk to be high, even if the distance from the self-vehicle "v" up to the person "m" is far.

Further, the default risk "r" for the person "m" is determined to be "D". As a concrete numerical value, an arbitrary positive constant is determined, in advance, and that value is memorized in the risk estimation parameter memory means 10.

D: a default risk "r" for the person "m".

Then, the risk estimation means 9 can calculate the risk "r" corresponding to the person "m", for example, by the following equation. Each of the risk estimation parameters K1, K2, K3, K4 and K5 and D is obtained from the risk estimation parameter memory means 10 by the risk estimation means 9.

$$r(i)=D-K1\times h(i)-K2\times w(i)-K3\times d(i)\times K4\times s-K5\times|\theta(i)|$$

However, in case where w(i) has a negative numerical value, since it means that the person "m(i)" is on the driveway climbing over the footway boundary object, then it is impossible to expect an effect of lowering the risk due to the footway boundary object. For that reason, it is better for the risk estimation means 9 to estimate the risk "r(i)" while changing the value K1 to "0", temporarily. Similarly, in case where the person "m(i)" is on the driveway, since the risk is high, it is preferable for the risk estimation means 9 to estimate the risk "r(i)" while enlarging the value K2, temporarily. Also, in case where "s" has a negative numerical value, since it means that the self-vehicle "v" is on the footway, i.e., the risk is high, then it is preferable for the risk estimation means 9 to estimate the risk "r(i)" while enlarging the value K4, temporarily. In this manner, it is possible to obtain the risk "r(i)" corresponding to the person "m(i)" as a numerical value thereof.

With the collision avoidance assisting system 1 for a vehicle, being constructed as was mentioned above, by further adding the direction information of the person "m", in addition to the various kinds of elements mentioned above, as an element for estimating the risk "r", an action of the person "m" can be predicted, also by taking the direction, into which the person "m" turns her/his face, into the consideration thereof, and this enables a more strict estimation of the risk "r"; i.e., it is possible to increase the accuracy of determining the risk "r" of collision, and thereby to achieve the collision avoidance assisting system 1 for a vehicle, enabling to generate the useful/effective alarm for the driver, but without annoying the driver therewith.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A collision avoidance assisting system for estimating a risk of any impending collision for a moving vehicle while said moving vehicle is moving, comprising:

a moving object detecting means which is configured to detect, for an impending collision risk of said moving vehicle while said moving object is moving, a moving object existing on a periphery of the vehicle;

a footway boundary detecting means which is configured to detect, for the impending collision risk of said moving vehicle while said moving object is moving, a position and a configuration of a footway boundary object which is provided as a division between a driveway and a footway, located on the same periphery of said moving vehicle as said moving object;

a risk estimation means which is configured to estimate, for the impending collision risk of said moving vehicle while said moving object is moving, a risk of collision that the moving object detected by said moving object detecting means will collide with said moving vehicle;

an alarm means which is configured to call an attention to a driver of said moving vehicle, upon a basis of the risk of collision estimated by said risk estimation means; and a positional relationship analyzing means, which is configured to output at least a relative distance between said moving object and said footway boundary object and a relative distance between said moving object and said moving vehicle, which is detected by said moving object detection means, and position/configuration information of the footway boundary object which is detected by said footway boundary object detecting means, wherein said risk estimation means estimates the risk of collision between the moving object, which is detected by said moving object detecting means, and said moving vehicle while said moving object is moving, at least from the relative distance between said moving object and said footway boundary object, which is outputted from said positional relationship analyzing means, and the relative distance between said moving object and said moving vehicle, which is outputted from said positional relationship analyzing means;

said footway boundary detecting means further outputs a height of said footway boundary object, and said risk estimation means further estimates the risk of collision between the moving object, which is detected by said moving object detecting means, and said moving vehicle while said moving object is moving, by also considering the height of said footway boundary object, which is outputted from said footway boundary detecting means, in addition to considering the relative distance between said moving object and said footway boundary object and the relative distance between said moving object and said moving vehicle, which are outputted from said positional relationship analyzing means.

2. The collision avoidance assisting system as described in the claim 1, wherein said positional relationship analyzing means further outputs a relative distance between said moving vehicle and said footway boundary object, and said risk estimation means estimates the risk of collision between the moving object, which is detected by said moving object detecting means, and said moving vehicle, also including the relative distance between said moving vehicle and said footway boundary object, which is outputted from said positional relationship analyzing means, in addition to the relative distance between said moving object and said footway boundary object and the relative distance between said moving object and said moving vehicle, which are outputted from said positional relationship analyzing means.

3. The collision avoidance assisting system as described in the claim 1, further comprising a risk estimation parameter memory means, which is configured to memorize a risk estimation parameter therein, and said risk estimation parameter memory means changes said risk estimation parameter depending on a maintenance condition, including at least one of a driving capacity of said moving vehicle, a weather and a road.

4. The collision avoidance assisting system as described in the claim 1, wherein said footway boundary detecting means has an object attribute discrimination function for detecting an attribute, including either one of a kind or a material of the footway boundary object on the periphery of said moving vehicle, and said risk estimation means estimates the risk of collision between the moving object, which is detected by said moving object detecting means, and said moving vehicle, depending on the attribute of said footway boundary object, which is detected by the object attribute discrimination function provided by said footway boundary detecting means.

5. The collision avoidance assisting system as described in the claim 4, wherein the object attribute discrimination function provided by said footway boundary detecting means is for detecting the height of said footway boundary object, in addition to either one of the kind or the material of the object including the footway boundary object, whereby estimating the risk of collision between the moving object, which is detected by said moving object detecting means, and said moving vehicle, depending on the detected height of said footway boundary object.

6. The collision avoidance assisting system as described in the claim 2, wherein as the footway boundary object on the periphery of said moving vehicle to be detected by said footway boundary detecting means is included a road facility, including any one of a road edge difference, or a guardrail, or a hedge, or a division line by a white line, and further said footway boundary detecting means detects the position and the configuration of said footway boundary object, and said positional relationship analyzing means has a moving object/footway boundary distance calculation means for calculating a distance between the moving object and the footway boundary object, a moving object/vehicle distance calculation means for calculating a distance between the moving object and the vehicle, and a vehicle/footway boundary distance calculation means for calculating a distance between the vehicle and the footway boundary object.

7. The collision avoidance assisting system as described in the claim 6, further comprising a video obtaining means for obtaining video information around the moving object, which exists on the periphery of the vehicle, wherein said moving object/footway boundary distance calculation means determines on whether the moving object is on a footway or not, with using the video information obtained by said video obtaining means, when said distance between the footway boundary object is near to zero (0), and corrects said distance between the moving object and the footway boundary object depending upon a result of said determination.

8. The collision avoidance assisting system as described in the claim 1, wherein said moving object detecting means further comprises a moving object moving direction detecting means for detecting a moving direction of the moving object, which is detected by said moving object detecting means, and said risk estimation means estimates the risk of collision between the moving object, which is detected by said moving object detecting means, and said moving vehicle, depending on the moving direction of said moving object, which is detected by said moving object moving direction detecting means.

9. A collision avoidance assisting system for estimating a risk of any impending collision for a moving vehicle while said moving vehicle is moving, comprising:

a moving object detecting means which is configured to detect, for an impending collision risk of said moving vehicle while said moving object is moving, a moving object existing on a periphery of the vehicle;

a footway barrier detecting means which is configured to detect, for the impending collision risk of said moving vehicle while said moving object is moving, a position and a configuration of a footway barrier object which is provided as a division between a driveway and a footway located on the same periphery of said moving vehicle as said moving object;

a risk estimation means which is configured to estimate, for the impending collision risk of said moving vehicle while said moving object is moving, a risk of collision that the moving object detected by said moving object detecting means will collide with said moving vehicle;

an alarm means which is configured to call an attention to a driver of said moving vehicle, upon a basis of the risk of collision estimated by said risk estimation means; and a positional relationship analyzing means, which is configured to output at least a relative distance between said moving object and said footway barrier object and a relative distance between said moving object and said moving vehicle, which is detected by said moving object detecting means, and position/configuration information of the footway barrier object, which is detected by said footway barrier object detecting means, wherein said risk estimation means estimates the risk of collision between the moving object, which is detected by said moving object detecting means, and said moving vehicle while said moving object is moving, at least from the relative distance between said moving object and said footway barrier object, which is outputted from said positional relationship analyzing means, and the relative distance between said moving object and said moving vehicle, which is outputted from said positional relationship analyzing means;

said footway barrier detecting means further outputs a height of said footway barrier object, and said risk estimation means further estimates the risk of collision between the moving object, which is detected by said moving object detecting means, and said moving vehicle while said moving object is moving, by also considering the height of said footway barrier object, which is outputted from said footway barrier detecting means, in addition to considering the relative distance between said moving object and said footway barrier object and the relative distance between said moving object and said moving vehicle, which are outputted from said positional relationship analyzing means.

10. The collision avoidance assisting system as described in the claim 9, wherein said positional relationship analyzing means further outputs a relative distance between said moving vehicle and said footway barrier object, and said risk estimation means estimates the risk of collision between the moving object, which is detected by said moving object detecting means, and said moving vehicle, also including the relative distance between said moving vehicle and said footway barrier object, which is outputted from said positional relationship analyzing means, in addition to the relative distance between said moving object and said footway barrier object and the relative distance between said moving object and said moving vehicle, which are outputted from said positional relationship analyzing means.

11. The collision avoidance assisting system as described in the claim 9, further comprising a risk estimation parameter memory means, which is configured to memorize a risk estimation parameter therein, and said risk estimation parameter memory means changes said risk estimation parameter depending on a maintenance condition, including at least one of a driving capacity of said moving vehicle, a weather and a road.

12. The collision avoidance assisting system described in the claim 9, wherein said footway barrier detecting means has an object attribute discrimination function for detecting an attribute, including either one of a kind or a material of the footway barrier object on the periphery of said moving vehicle, and said risk estimation means estimates the risk of collision between the moving object, which is detected by said moving object detecting means, and said moving vehicle, depending on the attribute of said footway barrier object, which is detected by the object attribute discrimination function provided by said footway barrier detecting means.

13. The collision avoidance assisting system as described in the claim 10, wherein as the footway barrier object on the periphery of said moving vehicle to be detected by said footway barrier detecting means is included a road facility, including any one of a road edge difference, or a guardrail, or a hedge, and further said footway barrier detecting means detects the position and the configuration of said footway barrier object, and said positional relationship analyzing means has a moving object/footway barrier distance calculation means for calculating a distance between the moving object and the footway barrier object, a moving object/vehicle distance calculation means for calculating a distance between the moving object and the vehicle, and a vehicle/footway barrier distance calculation means for calculating a distance between the vehicle and the footway barrier object.

14. The collision avoidance assisting system as described in the claim 13, further comprising a video obtaining means for obtaining video information around the moving object, which exists on the periphery of the vehicle, wherein said moving object/footway barrier distance calculation means determines on whether the moving object is on a footway or not, with using the video information obtained by said video obtaining means, when said distance between the footway barrier object is near to zero (0), and corrects said distance between the moving object and the footway barrier object depending upon a result of said determination.

15. The collision avoidance assisting system as described in the claim 9, wherein said moving object detecting means further comprises a moving object moving direction detecting means for detecting a moving direction of the moving object, which is detected by said moving object detecting means, and said risk estimation means estimates the risk of collision between the moving object, which is detected by said moving object detecting means, and said moving vehicle, depending on the moving direction of said moving object, which is detected by said moving object moving direction detecting means.

* * * * *